United States Patent [19]
Szucs et al.

[11] Patent Number: 4,772,397
[45] Date of Patent: Sep. 20, 1988

[54] PROCESS FOR REMOVING NUCLEIC ACIDS AND PURINE BASES FROM GELATIN

[75] Inventors: Miklós Szúcs, Budapest; Istvánné Palotás, Vác; József Szejtli; Éva Fenyves, both of Budapest, all of Hungary

[73] Assignees: Forte Fotokémial Idpar, Vác; Chinoin Gyógyszérvegyeszeti Gyár, Budapest, both of Hungary

[21] Appl. No.: 62,409

[22] Filed: Jun. 12, 1987

Related U.S. Application Data

[63] Continuation of Ser. No. 807,835, Dec. 11, 1985, abandoned.

[30] Foreign Application Priority Data

Dec. 19, 1984 [HU] Hungary ............... 4730

[51] Int. Cl.$^4$ ............................. B01D 15/08
[52] U.S. Cl. .................. 210/635; 210/198.2; 210/502.1; 530/355; 530/417
[58] Field of Search ............ 530/355, 413, 417; 210/635, 656, 658, 659, 198.2, 502.1; 55/67, 386

[56] References Cited

U.S. PATENT DOCUMENTS

| | | | |
|---|---|---|---|
| 3,472,835 | 10/1969 | Buckler | 426/387 |
| 3,649,456 | 3/1972 | Benneville | 530/355 |
| 4,199,450 | 4/1980 | Dulout | 530/355 |
| 4,360,590 | 11/1982 | Tomka | 530/355 |
| 4,426,292 | 1/1984 | Wernick | 210/635 |
| 4,515,714 | 5/1985 | Kawahara | 530/417 |

FOREIGN PATENT DOCUMENTS

| | | | |
|---|---|---|---|
| 177419 | 7/1978 | Hungary | 210/635 |
| 60-32210 | 11/1985 | Japan | 502/404 |
| 2066265 | 7/1981 | United Kingdom | 530/417 |
| 2083821 | 3/1982 | United Kingdom | 502/404 |

OTHER PUBLICATIONS

On the Method for the Quantitative Separation of Nucleic Acid in Native Form From Photographic Gelatin, Masuda, The Journal of Photographic Science, vol. 30, 1982, pp. 124–128.

Primary Examiner—Ernest G. Therkorn
Attorney, Agent, or Firm—Schweitzer & Cornman

[57] ABSTRACT

The invention relates to a process for removing nucleic acids and purine bases from gelatine by (a) adding cyclodextrin bead polymer having a particle size of 20 to 600 μ, a cyclodextrin content of 30 to 70% and a polyvinyl alcohol content of 0.3 to 0.5% to the gelatin solution in a weight ratio of 1:1 to 10:1 calculated on the amount of the gelatin then filtering off the cyclodextrin polymer or (b) passing the gelatin solution through a cyclodextrin bead polymer column, whereby the amount of the gelatin is 5 to 50% of the weight of the column charge, then eluting the nucleic acids and the purine bases from the cyclodextrin bead polymer.

5 Claims, No Drawings

PROCESS FOR REMOVING NUCLEIC ACIDS AND PURINE BASES FROM GELATIN

This is a continuing application of application Ser. No. 807,835, filed on Dec. 11, 1985, now abandoned.

The invention relates to a process for removing nucleic acids and purine bases from gelatine by using cyclodextrin bead polymers.

Gelatin contains many inorganic and organic microcomponents originally or due its production. Organic microcomponents are among others the nucleic acids and the purine bases which restrain the growth of the crystals and the development of the light sensitivity in gelatin containing silver halide photographic emulsions (T. H. James: The Theory of the Photographic Process, MacMillan, New York, 1977). The presence of these inhibitors is often non desired, so the elimination thereof has become important for a long time.

For removing the nucleic acids and its derivatives ion exchange resins were used. The polystyrene-divinylbenzene cation exchange resins (e.g. Amberlite types) are used wide-spread. The disadvantage of these resins is that they remove only adenine and guanine, the nucleic acids remain in the gelatine (T. Ohno—H. Irie: J. Soc. Phot. Sci. Techn. Japan, 39, (1976) 146). Recently dextrane derivatives of different structure were used (e.g. Sephadex types). By the use thereof about the 75% of the nucleic acids may be removed from the gelatine (H. Masuda—H. Kimura: J. Phot. Sci. 30, (1982) 124). For removing all the inhibitors the possibility exists that the nucleic acids are decomposed to their components with nuclease then the purine bases are removed with cation exchange resins. This process is, however, expensive. The nucleic acids may be hydrolized also with hydrochloric acid but in this case also the gelatin decomposes so this process may not be used in the gelatin production.

The aim of the present invention is to elaborate a process by which both the nucleic acids and the purine bases may be removed totally and economically without damaging the gelatine. According to the process of the invention cyclodextrin bead polymers are used for this purpose.

The cyclodextrins are cyclic, non reducing oligosaccharides containing 6, 7 or 8 glucopyranose units and may be produced by the enzymatic decomposition of starch. In the practice they are used mainly due to their ability to form inclusion complexes (Szejtli J.: Cyclodextrins and Their Inclusion Complexes, Akadémiai Kiadó, Budapest 1982).

In former experiments (Hoffmann, J. L.—Bock, R. M.: Biochemistry, 9, (1974) 909) it has been established by diferential UV-spectroscopy that among others the adenosine, cytosine, guanine, uridine monophosphates do not react with α-cyclodextrin and only adenosine and inosine monophosphates react with β-cyclodextrin. The interaction with dinucleotides was weaker and no interaction could be observed between the polynucleotides and cyclodextrins. Therefore it is surprising that the cyclodextrin can bind the nucleic acids and purine bases from diluted aqueous solutions in such extent that these substances may be removed selectively.

The invention is based on the recognition that the cyclodextrin bead polymer may act both as inclusion complex forming substance and as adsorbent, consequently is suitable for removing the purine bases of small molecule mass and the nucleic acid macromolecules.

Cyclodextrin bead polymers are produced from cyclodextrin with a suitable bifunctional reagens (e.g. epichlorohydrine or ethylene glycol diepoxypropyl ether) in the presence of polyvinyl acetate by cross-linking (HU-PS 177,419, 1978). Their cyclodextrin content may vary between 30 and 70%, preferably between 50 and 60%, their polyvinyl alcohol content may amount to 0.3 to 0.5%, have a particle size between 20 and 600μ, preferably between 90 and 300μ.

According to the process of the invention cyclodextrin bead polymer having a cyclodextrin content of 30 to 70%, a polyvinyl alcohol content of 0.3 to 0.5% and a particle size of 20 to 600μ is added to the gelatin solution in a weight ratio of from 1:1 to 10:1 calculated on the weight of the gelatin, then the cyclodextrin bead polymer is filtered off or the gelatin solution is conducted through a cyclodextrin pearl polymer column, wherein the amount of the gelatin is 5 to 50% of the dry weight of column charge, whereafter the nucleic acids and the purine bases are eluted from the cyclodextrin bead polymer.

According to the process of the invention the bead polymer is removed from the solution after the treatment of the gelatin has been finished. The gelatin solution being free from the restrainers is processed further as usual.

According to the invention the bead polymer may be used also as column charge in which case it is not added to the gelatin solution. In this case a 5 to 10% gelatin solution is let to flow through the column of 40° to 60° C. whereby the amount of the dry gelatin treated in the column is 5 to 50%, preferably 10 to 30% of the dry weight of the column charge.

By the treatment both the nucleic acids and the purine bases are removed from the gelatin. This process may be followed by nephelometric examination.

This examination is based on the fact that the crystals of smaller size scatter the light less than those of greater size, consequently the aqueous gelatin suspension of the latter is much more turbid (the optical density measured at $\lambda = 546$ nm is higher). In a suspension prepared with restrainer containing gelatin solution the crystals grow hardly, thus after a defined time heat-treatment (Ostwald-ripening) low density is obtained. When the restrainers are, however, removed, the crystals become greater and thus after the same time the suspension will have a higher density.

Table 1 shows that the active gelatin containing relatively high amount of restrainers (700 ppm DNA, 60 ppm adenine) prevents the growth of the crystals strongly, after the treatment of the gelatin the crystals are growing just as quickly as in case of inert gelatine which does not contain restrainers.

TABLE 1

| Time of the heat-treatment at 60° C., min. | $D_{\lambda 546}$ Active gelatine | | Inert gelatin |
|---|---|---|---|
| | before treatment | after treatment | |
| 5 | 0.13 | 0.40 | 0.51 |
| 10 | 0.20 | 0.68 | 0.80 |
| 20 | 0.27 | 0.97 | 1.11 |
| 40 | 0.33 | 1.18 | 1.30 |
| 80 | 0.34 | 1.19 | 1.32 |

For regenerating the cyclodextrin bead polymers used according to the invention the nucleic acids and the purine bases are removed by elution or by mixing the bead polymer in about 5-times amount of the eluent solution, filtration, or by flowing the same amount of the eluent through the column. From the eluent such as amount is let to flow through the column during 1 hour which corresponds to 20 to 40% of the column charge.

As eluents buffer solutions of 7.5 to 10.5 pH are used which may also contain 0.1 to 2 mole/liter sodium chloride.

The gelatin which has been adsorbed on the polymer particles is removed by washing with hot water and/or enzymatic treatment (protease) followed by washing with water.

The advantages of the process of the invention may be summarized as follows:

(1) By using cyclodextrin bead polymers both the nucleic acids and the purine bases may be removed in one operation.

(2) The cyclodextrin bead polymer has a greater ability to bind DNA and purine base than that of the dextran based resins.

(3) The use of cyclodextrin bead polymer is much more economic than that of the dextran based resins.

The invention is shown by the following Examples.

EXAMPLE 1

Into a water jacketed vessel of 300 ml volumen, which is held at 45° C. with an ultrathermostat, $\beta$-cyclodextrin bead polymer (particle size d=90 to 300$\mu$) containing 15 g of dry substance and being preswollen in sodium acetate/acetic acid buffer (pH=3.4) is introduced then 100 ml of 0.025 g/l DNA solution is added and stirred for 1 hour.

In other experiment Molselect G-50 (d=100 to 320$\mu$) respectively Sephadex G-50 (d=50 to 150$\mu$) bead polymers containing 15 g of dry substance, which are preswollen in KH$_2$PO$_4$ buffer (pH=7.5), are used.

From the dispersions the polymer particles are removed by filtration in all three cases and each are stirred for elution with 5×100 ml of KH$_2$PO$_4$/NaOH buffer (pH=10.5) containing 0.2 mole/liter sodium chloride for 30 minutes then filtered. The restrainer content of the eluates is determined spectrophotometrically.

The examinations with the three bead polymers are repeated but 100 ml of 0.015 g/liter adenine solution are used instead of the DNA solution.

The results are given in Table 2.

TABLE 2

| | Inhibitor content, mg | | | | | | | | |
|---|---|---|---|---|---|---|---|---|---|
| | Cyclodextrin | | | Molselect | | | Sephadex | | |
| Inhibitor | B | K | K/B | B | K | K/B | B | K | K/B |
| DNA | 2.5 | 2.3 | 0.92 | 2.5 | 1.57 | 0.63 | 2.5 | 1.8 | 0.72 |
| AD | 1.5 | 1.35 | 0.91 | 1.5 | 1.07 | 0.71 | 1.5 | 1.14 | 0.76 |

Remark:
B = substance introduced,
K = substance removed
AD = adenine

The data of the Table show that the cyclodextrin polymer binds both the DNA and the adenine better than the dextran based substances.

EXAMPLE 2

In the manner as described in Example 1 2.5 mg of DNA and 5 g of restrainerfree inert gelatin are dissolved in 100 ml of sodium acetate/acetic acid buffer (pH=3.4). To the solution $\beta$-cyclodextrin bead polymer (d=90 to 300$\mu$) containing 15 g of dry substance and being preswollen in sodium acetate/acetic acid buffer (pH=3.4) is added and the resulting dispersion is stirred for 3 hours.

In other experiments Molselect G-50 bead polymer (d=100 to 320$\mu$) and KH$_2$PO$_4$ buffer (pH=7.5) are used.

From the dispersion the polymer particles are removed in both cases and each are stirred for elution with 5×100 ml of KH$_2$PO$_4$/NaOH buffer (pH=10.5) containing 0.2 mole/liter sodium chloride for 30 minutes then filtered. The restrainer content of the eluates is measured spectrophotometrically.

The examinations with the two bead polymers are repeated but 1.5 mg of adenine are used instead of DNA.

The results are summarized in Table 3.

TABLE 3

| | Inhibitor content, mg | | | | | |
|---|---|---|---|---|---|---|
| | Cyclodextrin | | | Molselect | | |
| Inhibitor | B | K | K/B | B | K | K/B |
| DNA | 2.50 | 2.30 | 0.92 | 2.50 | 1.80 | 0.72 |
| AD | 1.50 | 1.36 | 0.91 | 1.50 | 1.00 | 0.66 |

Remark:
B = substance introduced,
K = substance removed,
AD = adenine

The data of the Table show that the cyclodextrin polymer removes the restrainers better from the gelatin solution than the dextran based substance.

EXAMPLE 3

Into a water jacketed column (height 30 cm, diameter 3 cm), which is held at 55° C. with an ultrathermostat, $\beta$-cyclodextrin bead polymer containing 30 g of dry substance and being preswollen in sodium acetate/acetic acid buffer (pH=3.4) is filled.

The solution of the gelatin to be treated is passed throguh the column (the gelatin solution is prepared by dissolving 2.5 mg of DNA and 5 g of restrainerfree inert gelatin in 100 ml of sodium acetate/acetic acid buffer (pH=3.4)). The column charge is eluted with 500 ml of KH$_2$PO$_4$/NaOH buffer (pH=10.5) which contains 0.2 mole/liter sodium chloride (passing rate 100 ml/hour).

Also examinations are performed but 1.5 g of adenine instead of DNA respectively Molselect instead of the cyclodextrin polymer with DNA, respectively, adenin are used.

The results are given in Table 4.

TABLE 4

| | Inhibitor content, mg | | | | | |
|---|---|---|---|---|---|---|
| | Cyclodextrin | | | Molselect | | |
| Inhibitor | B | K | K/B | B | K | K/B |
| DNA | 2.50 | 2.35 | 0.94 | 2.50 | 1.00 | 0.40 |
| AD | 1.50 | 1.46 | 0.97 | 1.50 | 0.96 | 0.64 |

From the Table it can be seen that the cyclodextrin polymer when used as column charge is also more effective than the dextran based substance.

We claim:

1. A process for removing nucleic acids and purine bases from gelatin comprising bringing into contact a gelatin solution and a cross-linked beta-cyclodextrin bead polymer having a particle size of about 20 to 600 microns, a beta-cyclodextrin content of about 30% to 70% by weight and a polyvinyl alcohol content of about 0.3% to 0.5% by weight; separating said crosslinked polymer and said gelatin solution to obtain a gelatin solution substantially free from nucleic acids and purine bases.

2. A process of claim 1 wherein said contacting is accomplished by adding said polymer to a gelatin solution in a weight ratio of polymer to gelatin of about 1:1 to 10:1 and said separation is accomplished by filtering off the polymer from the gelatin solution.

3. A process of claim 2 wherein said polymer has a particle size of about 90 microns to 300 microns and a beta-cyclodextrin content of about 50% to 60% by weight.

4. A process of claim 1 wherein said contacting is accomplished by passing a gelatin solution through a column of said crosslinked beta-cyclodextrin bead polymer in an amount of about 5% to 50% of the dry weight of the polymer in the column; then collecting the eluted gelatin solution substantially free of nucleic acids and purine bases.

5. A process of claim 4 wherein the amount of gelatin used is about 10% to 30% of the dry weight of the polymer in the column.

* * * * *